(12) United States Patent
Krulik et al.

(10) Patent No.: US 6,645,385 B2
(45) Date of Patent: Nov. 11, 2003

(54) SYSTEM AND METHOD FOR REMOVAL OF FLUORIDE FROM WASTEWATER USING SINGLE FLUORIDE SENSING ELECTRODE

(75) Inventors: Gerald A. Krulik, San Clemente, CA (US); Gennadiy Sverdlov, Castro Valley, CA (US); William Hannan, Pleasanton, CA (US)

(73) Assignee: Ionics, Incorporated, Watertown, MA (US)

(*) Notice: Subject to any disclaimer, the term of this patent is extended or adjusted under 35 U.S.C. 154(b) by 0 days.

(21) Appl. No.: 09/960,614

(22) Filed: Sep. 21, 2001

(65) Prior Publication Data

US 2002/0117456 A1 Aug. 29, 2002

Related U.S. Application Data

(60) Provisional application No. 60/235,471, filed on Sep. 26, 2000.

(51) Int. Cl.[7] .............................. C02F 1/52; C02F 5/08; B01D 17/12
(52) U.S. Cl. ................... 210/709; 210/85; 210/96.1; 210/205; 210/739; 210/743; 210/915; 210/749
(58) Field of Search .................. 210/85, 96.1, 103, 210/198.1, 199, 202, 205, 709, 719, 739, 743, 749, 754, 755, 752, 259, 806, 915; 422/62, 105, 108, 111; 436/124, 125; 204/416, 419, 420

(56) References Cited

U.S. PATENT DOCUMENTS

| | | | |
|---|---|---|---|
| 4,028,237 A | 6/1977 | Nishimura et al. | |
| 4,226,710 A | 10/1980 | Bruckenstein | |
| 4,263,104 A | * 4/1981 | Diggens et al. | 204/416 |
| 4,830,757 A | * 5/1989 | Lynch et al. | 210/96.1 |
| 5,215,632 A | 6/1993 | Fritts et al. | |
| 5,516,423 A | 5/1996 | Conoby et al. | |
| 5,750,033 A | 5/1998 | Ikeda et al. | |
| 5,910,251 A | * 6/1999 | Allen et al. | 210/915 |
| 6,413,417 B1 | * 7/2002 | Yamasaki et al. | 210/915 |

\* cited by examiner

Primary Examiner—Joseph Drodge

(57) ABSTRACT

A system for removing fluoride from wastewater is provided. The system comprises a reaction tank for processing said wastewater by adding calcium salts, a filtration tank for removing the precipitated fluoride formed in the reaction tank, a single fluoride electrode disposed at the reaction tank for measuring a concentration of fluoride in the influent wastewater and providing an output signal, and a programmable controller for controlling addition of said calcium salts into said reaction tank. The programmable controller defines a setpoint of fluoride concentration in the reaction tank and automatically controls addition of calcium salts based on the setpoint and the output signal provided by the single fluoride electrode. A method of removing fluoride from wastewater is also provided.

19 Claims, 6 Drawing Sheets

SYSTEM AND METHOD FOR REMOVAL OF FLUORIDE FROM WASTEWATER USING SINGLE FLUORIDE SENSING ELECTRODE

CROSS REFERENCE TO RELATED APPLICATION

This application claims priority of provisional application Serial Number 60/235,471, filed Sep. 26, 2000, the disclosure of which is hereby incorporated by reference.

FIELD OF THE INVENTION

The present invention relates generally to wastewater treatment. More particularly, the present invention relates to systems and methods for removing fluoride from wastewater using single fluoride sensing electrode.

BACKGROUND OF THE INVENTION

Fluoride must be removed from wastewater generated at semiconductor fabrication and other industrial plants. This is an expensive process which is accomplished by adding calcium. The calcium is typically added either as lime or as calcium chloride solution which precipitates insoluble calcium fluoride. The wastewater which has been chemically treated to remove fluoride is typically either filtered or allowed to settle in specially designed settling tanks. One problem of prior art methods using lime or soluble calcium salts is the significant over-adding of the calcium to ensure that the fluoride is sufficiently precipitated. In the case of lime, excesses of 200–400% of the stoichiometric amount are commonly used. Despite these efforts however, fluoride removal is often less than adequate.

There has been no systematic study of high fluoride concentration (HFC) wastewater treatment. High fluoride concentration is defined as over 2000 ppm (2 g/l) fluoride and such high concentrations present additional problems for treatment. Accordingly, further developments in automatically and economically removing fluoride from wastewater, especially high fluoride concentration wastewater are needed.

SUMMARY OF THE INVENTION

It is an object of the present invention to provide a system and method for removing fluoride from wastewater continuously in compliance with discharging limits, while simultaneously allowing optimum use of calcium salts and providing good filtration. It is a further object of the present invention to provide a system and method that can be used for batch treatment of fluoride, continuous treatment of wastewater with random dumps of high fluoride concentration, and continuous treatment of wastewater with continuously varying high fluoride concentration.

In accordance with the present invention, there is provided a system for removing fluoride from wastewater. The system comprises a reaction tank for processing said wastewater by adding calcium salts, a filtration tank for removing the precipitated fluoride formed in the reaction tank, a single fluoride electrode disposed at a first input of the reaction tank for measuring a concentration of fluoride in the influent wastewater and providing an output signal, and a programmable controller for controlling addition of said calcium salts into said reaction tank. The programmable controller defines a setpoint of fluoride concentration in the reaction tank and automatically controls addition of calcium salts based on the setpoint and the output signal provided by the single fluoride electrode.

In another embodiment of the present invention, the system comprises a reaction tank for processing said wastewater by adding calcium salts, a filtration tank for removing the precipitated fluoride formed in the reaction tank, a first single fluoride electrode disposed at a first input of the reaction tank for measuring a concentration of fluoride in the influent wastewater and providing an output signal, a second single fluoride electrode disposed at the output of the filtration tank for monitoring a concentration of fluoride in the filtered wastewater and providing an output signal, and a programmable controller for controlling addition of said calcium salts into said reaction tank. The programmable controller defines a setpoint of fluoride concentration in the reaction tank and automatically controls addition of calcium salts based on the setpoint and the output signal provided by the first and second single fluoride electrode.

The reaction tank is preferably provided with a pH sensor for measuring pH of the influent wastewater fed into the reaction tank and providing an output signal. The pH sensor is connected to the controller which defines a setpoint of pH in the reaction tank and automatically controls addition of an acid or basic solution based on the pH setpoint and the output signal provided by the pH sensor.

In one embodiment, the reaction tank comprises at least a first, second, and third tank in series, and each tank is provided with a pH sensor for measuring pH in each tank. The first tank is added from stoichiometric to 125% stoichiometric of calcium salts, and said second and third tanks are added from 5 to 25% of the amount of calcium salts added to the first tank.

In another aspect of the present invention, there is provided a method of removing fluoride from wastewater. The method comprises defining a setpoint of concentration of fluoride using a programmable controller, measuring a concentration of fluoride in said wastewater using a first single fluoride electrode, automatically adding calcium salts to the wastewater in an amount based on said setpoint defined by the controller and the concentration of fluoride measured by the first single fluoride electrode, and monitoring a concentration of fluoride in the effluent wastewater using a second single fluoride electrode to ensure meeting discharging limits. Preferably, the calcium is added to the reaction tank in an amount of from stoichiometric to 125 percent of stoichiometric.

The method may further comprise defining a pH setpoint using the controller and measuring the pH of the wastewater using a pH sensor, and automatically adding an acid or basic solution to the wastewater in an amount based on the setpoint defined by the controller and the pH measured by the pH sensor. The pH setpoint is preferably defined at a value in a range from 6 to 9. A coagulant and/or flocculant may also be added to the wastewater to facilitate removal of precipitate fluoride.

The concentration of fluoride contained in the influent wastewater to be treated by the present method can be continuously varied, ranging from 50 to 10,000 ppm. The concentration of fluoride contained in the effluent water treated by present method can be as low as from 2 to 10 ppm.

BRIEF DESCRIPTION OF THE DRAWINGS

Other objects and advantages of the present invention will become apparent upon reading the detailed description of the invention and the appended claims and accompanied drawings in which:

DETAILED DESCRIPTION OF THE INVENTION

Figure 1:
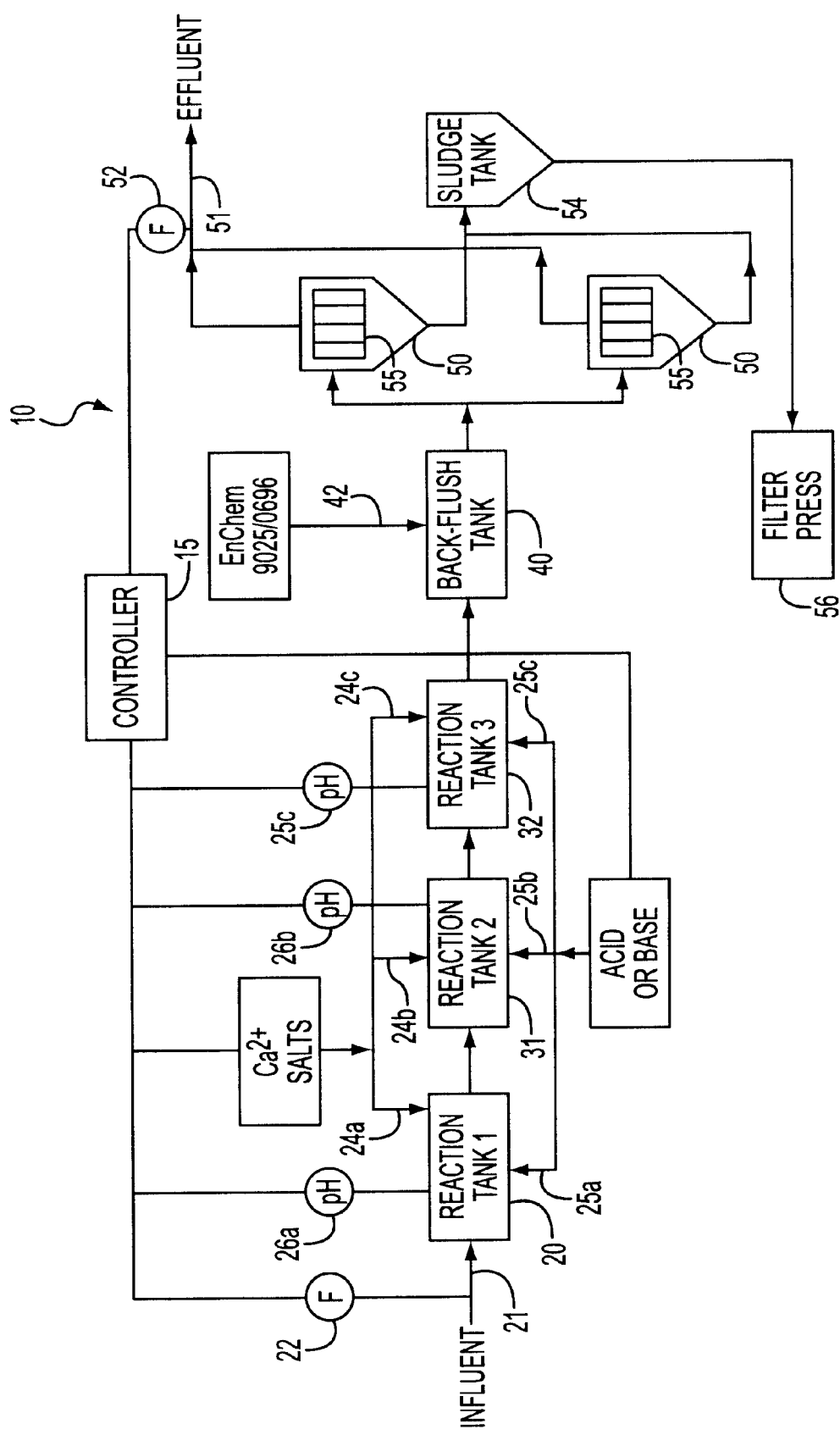
FIG. 1 is a schematic view of a system of one embodiment of the present invention for removing fluoride from wastewater using single fluoride electrode.

FIG. 1 is a schematic view of a system 10 for removing fluoride from wastewater according to the present invention. In general, the system 10 comprises a reaction tank 20 for processing the influent wastewater, a filtration tank 50 for removing any precipitated fluoride formed in the reaction tank 20, a single fluoride electrode 22 disposed at an input 21 of the reaction tank 20 for measuring the concentration of fluoride in the influent wastewater and providing an output signal, and a programmable controller 15 for controlling addition of calcium salts into the reaction tank 20 responsive to the output signal provided by the single fluoride electrode. [[a single fluoride electrode 52 disposed at an output 51 of the filtration tank 50 for monitoring the concentration of fluoride in the discharged treated water,]]

The reaction tank 20 comprises an input 21 for feeding influent wastewater into the tank 20, and an input 24a for adding calcium salts to the reaction tank 20 to form precipitated fluoride. A single fluoride electrode 22 is disposed at the input 21 of the reaction tank 20 to measure the concentration of fluoride in the influent wastewater. The single fluoride electrode 22 is connected to the computer programmable controller 15 which defines a setpoint of fluoride concentration. The controller 15 automatically initiates addition of calcium salts into the reaction tank 20 when the reading of the single fluoride electrode 22 is greater than the setpoint defined by the controller 15.

The reaction tank 20 conducts the first stage of fluoride removal according to the present invention, that is, the formation of precipitated calcium fluoride by reacting calcium ions added to the tank 20 with the fluoride contained the influent wastewater to be treated, as shown by the following equation:

$$Ca^{+2} + 2F^- \rightarrow CaF_2(s) \quad (1)$$

Figure 2:
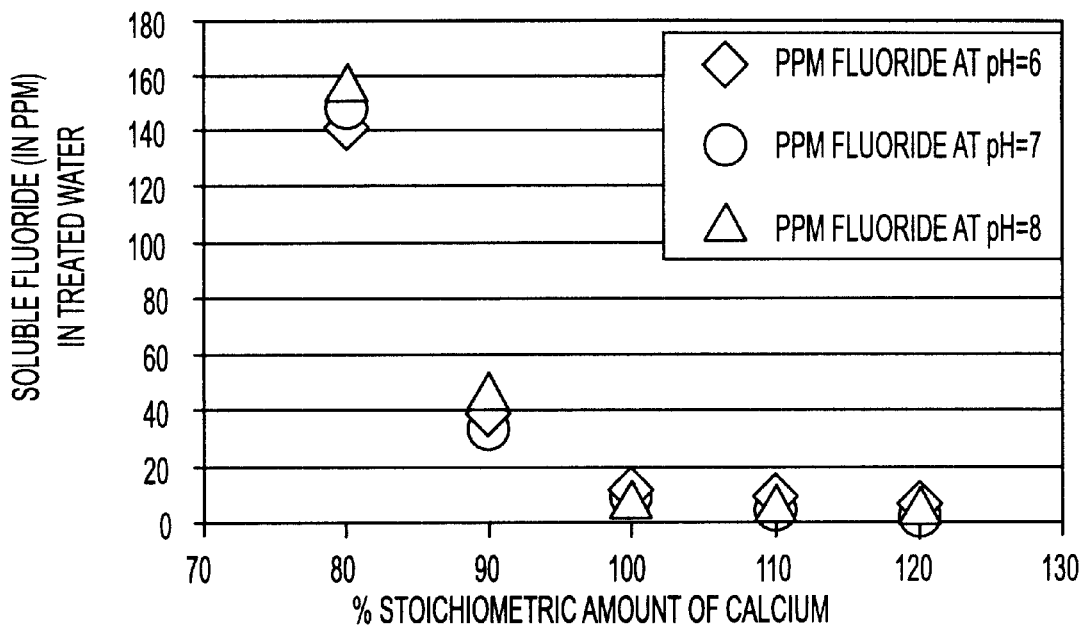
FIG. 2 is a graph showing soluble fluoride versus stoichiometer amount of calcium at various pH level.

FIG. 2 shows that use of a slight stoichiometric excess of calcium allows even amounts exceeding 1000 ppm fluoride ($F^-$) in influent wastewater to be reduced to less than 10 ppm soluble ($F^-$) at pH=7–8. The driving force for fluoride removal is the very low solubility of calcium fluoride ($CaF_2$) ($K_{sp}$=3.9×10$^{-11}$). FIG. 2 shows that the precipitation is most complete at pH 7. Removal to below the solubility limits of 16 ppm (as $CaF_2$) or 8 ppm as $F^-$ is accomplished by adding more than the stoichiometric quantity of calcium. The use of soluble calcium salts gives much more efficient chemical usage than is provided with lime slurry precipitation. Lime slurries are highly basic and tend to form shells of precipitated calcium fluoride and other salts on the surface of the slurry particles, limiting total chemical usage. Lime slurries are much slower to react. The kinetics of calcium fluoride formation and precipitation are much faster with calcium chloride and other soluble calcium salts than with sparingly soluble calcium salts such as calcium oxide, calcium hydroxide, and calcium sulfate. In a preferred embodiment, the pH is maintained at about a maximum of 4–6 to keep calcium in the form of rapidly reacting calcium ($Ca^{+2}$) ions. If the pH is allowed to rise above about 6, calcium hydroxide begins to form and the precipitation reactions become less efficient, just as if lime slurry had been added directly.

Figure 3:
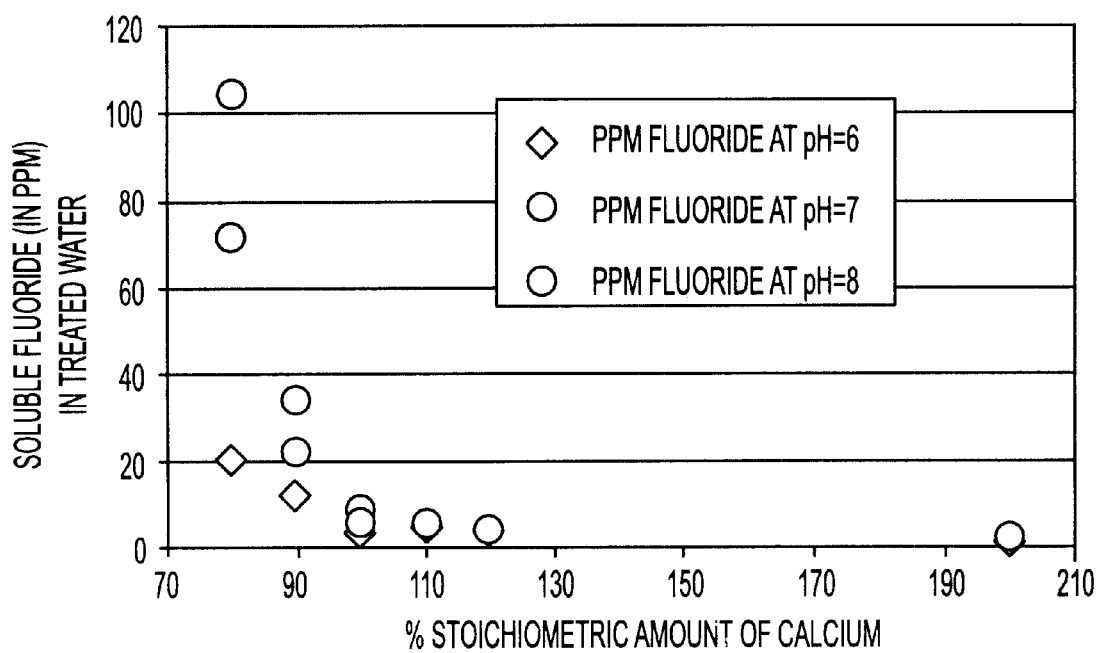
FIG. 3 is a graph showing soluble fluoride in the presence $NH_4^+$ versus stoichiometric amount of calcium at various pH level.

FIG. 3 shows that the precipitation chemistry also works in the presence of relatively high amounts of ammonium ion, such as might be found in a buffered oxide waste (typically more than 50 to 100 ppm). Ammonium ion acts as a complexing agent for calcium, retarding fluoride precipitation, thus a relatively large amount of calcium ions is used to give complete precipitation. Regardless of whether ammonium ion is present, the system 10 of the present invention reduces the soluble fluoride level to below typical semiconductor fab effluent limits of 10 ppm. Organic materials such as surfactants, organic amines, polymeric stabilizers, and common solvents such as isopropanol and acetone do not affect fluoride removal once the process has been established. Dosage of calcium adjustment may be necessary to overcome potential counteracting effects of dispersants known to one of ordinary skill in the art. In accordance with the present invention, an amount of from stoichiometric to about 125% of stoichiometric of calcium is used to precipitate fluoride. Preferably, a 5 to 10% stoichiometric excess of calcium ($Ca^{+2}$) is used.

Figure 4:
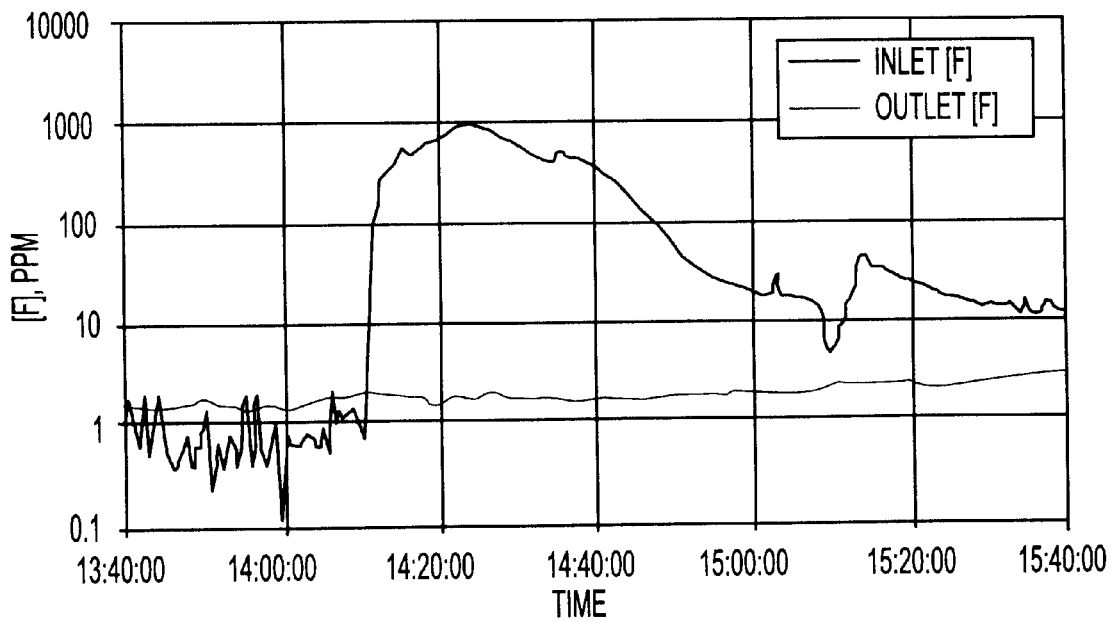
FIG. 4 is a graph showing a fluoride dump and fluoride concentration treated in accordance with an exemplary embodiment of the invention.
Figure 5:
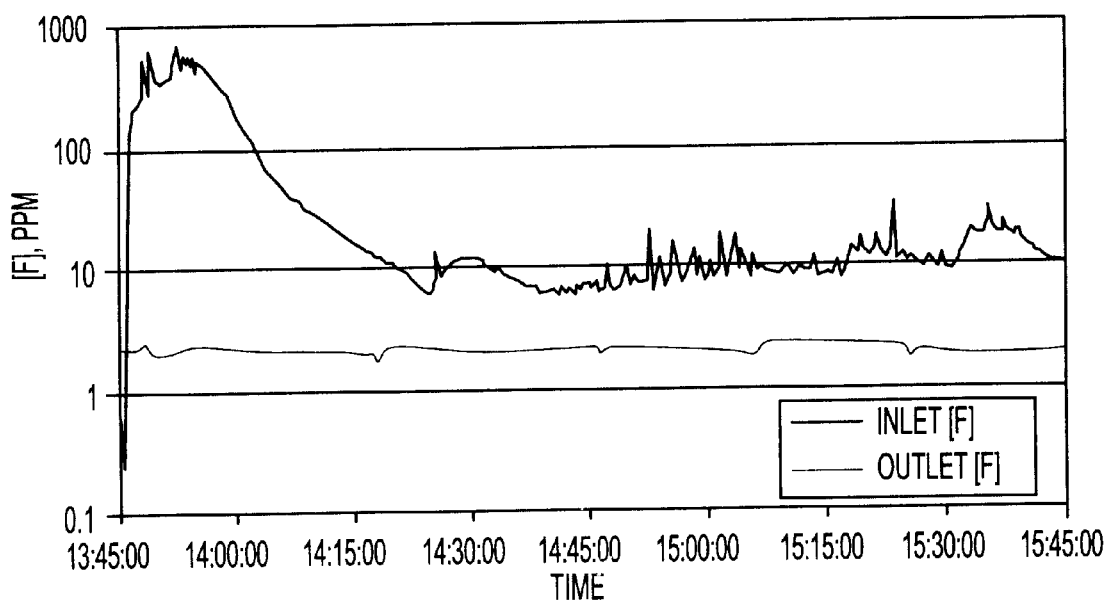
FIG. 5 is a graph showing a fluoride dump inlet and fluoride concentration outlet treated in accordance with another exemplary embodiment of the invention.

Fluoride is normally present at below the discharge levels, except when certain process equipment is used. These small dumps of a few grams are easily handled. Infrequently there are massive process bath dumps of 2–4 kg of fluoride. Of particular advantage, the system 10 of the present invention automatically processes all dumps to below the 10 ppm discharge limit, even when the fluoride dumps coincide with massive acid dumps. FIGS. 4 and 5 show the treatment results using the present system and method for two large fluoride dumps. The data in FIGS. 4 and 5 are presented as logarithmic scales for clarity, to show the low levels of achieved fluoride output. Even with an apparent fluoride input of 1000 ppm, the present system 10 can achieve an output level at 2–4 ppm.

The fluoride input about 1000 ppm in FIGS. 4 and 5 is lower than the true value. There are several reasons for the difference between the fluoride electrode readings and the actual amounts of $F^-$ input to the wastewater. One reason is the use of ion exchange electrodes as the control sensors. The fluoride electrode sensor only reads total $F^-$ if all the HF is ionized, which is only the case at about pH 4–6. The pH is being continuously adjusted in the reaction tank 20 to compensate for both low pH input and the hydrogen ion released during CaF$_2$ precipitation. At the same time, the system 10 immediately begins to titrate F$^-$ with Ca$^{+2}$ as soon as the setpoint for fluoride, typically a value from 10 to 40 ppm, is reached. Finally, some of the F$^-$ overflows out of the reaction tank 20 prior to precipitation, to additional reaction tanks 31 and 32 as described below. The treatment system 20 of the present invention takes all these factors into account, to give the very low F$^-$ output values shown in FIGS. 4 and 5.

Referring again to FIG. 1, the treated water is then passed to a filter tank 50 to remove the precipitated fluoride formed in the reaction tank 20. The filter tank 50 is operated in two modes, namely, a filter tank operating mode and the filter tank backflush mode. During the operation mode, the wastewater containing fluoride precipitates is pumped from the filter tank 50 through the membrane 55. As the aqueous solution passes through the membrane 55, the fluoride precipitate particles do not pass through, but instead build up on the outside surface of the membrane 55. The filtered "clean" water overflows out of the top of the filter tank 50 through an output 51 for discharge or recycling. A single fluoride electrode 52 is disposed at the output 51 to monitor the concentration of fluoride to ensure that the discharging of the filtered water meets the government regulations. During the backflush mode, the filtration membrane 55 is backflushed causing the filtered fluoride precipitates to drop from the outside surface of the membrane 55 to the bottom of the filtration tank 50. The filtered fluoride precipitates are collected and pumped to a sludge holding tank 54 where the precipitates are concentrated to 1 to 5 percent solid. For a denser solid, the concentrated solid is pumped to a filter press 56 which can achieve 30 to 90 percent solid. At this point, non-hazardous solid waste can be disposed of safely.

In one embodiment of the present invention, the controller 15 automatically controls addition of calcium salts based on the setpoint defined by the controller 15, the fluoride concentration in the reaction tank 20 as measured by the single fluoride electrode 22 and the fluoride concentration in the discharged water as measured by the single fluoride electrode 52 disposed at an output 51 of the filtration tank 50.

In one embodiment, the filtration membrane 55 in the filter tank 50 is generally in a tubular "sock" configuration. The membrane sock is placed over a slotted tube to prevent the sock from collapsing during use. The membrane material is commercially available from a variety of sources, and preferably has a pore size in the range of 0.5 to 10 microns, with a pore size of 1 micron being most preferred. Generally the filter tank 50 is equipped with an array of microfiltration membranes 55. The membrane sock is placed over a slotted support tube to prevent the sock from collapsing during use. In order to achieve high flow rates and flux values, a number of membranes or membrane modules, each containing a number of individual filter socks, may be used. It has been found that the treated wastewater flow rate through 0.5 to 10 microns microfiltration membranes can be in the range from 200 GFD to 1500 GFD. The operating pressures of the filter tank 50 range from 3 to 15 psi (0.2–1.0 atmosphere) with a membrane flux ranging from 100–1000 gallons/ft$^2$ (or 4–40 m$^3$/m$^2$) of membrane per day (gfd). These parameters vary depending on the number of membranes, their size, and influent wastewater concentration and flow.

In one embodiment, a pH sensor 26a is preferably disposed at the reaction tank 20 to measure the pH of the influent wastewater fed into said reaction tank 20. The pH sensor 26a is connected to the controller 15 which defines a pH setpoint for the wastewater in the reaction tank 20. An input 25a is disposed at the reaction tank 20 for adding an acid or base to adjust the pH of the wastewater in the reaction tank 20. The controller 15 reads the pH sensor 26a in real time and automatically controls the addition of an acid or a base solution when the reading is varied from the setpoint defined by the controller 20.

The pH of the wastewater in the reaction tank 20 is controlled in a range from about 6 to 9. The control of pH is important. Too low a pH will cause increased addition of calcium salts since the precipitated fluoride tends to immediately re-dissolve unless excess calcium is present. Too high a pH will cause precipitation of calcium hydroxide which is slow to re-dissolve below pH7, and also causes increased addition of calcium. In the industrial wastewater, there is a frequent pH changes, or constant low pH wastewater flow due to various rinses and process tank dumps. The pH changes of the wastewater in the reaction tank 20 are detected in real time through the pH sensor 26a. The controller 15 maintains a pH setpoint for the wastewater in the reaction tank 20 by automatically adding an acid or basic solution whenever the reading of the pH sensor 26a is different from a setpoint defined by the controller 15. The exact computer algorithm for the controller 15 and set points are important to avoid feedback loops, oscillating pH cycles, and overuse of chemicals. The exact computer algorithm may be programmed by those of ordinary skill in the art without undue experimentation. Typically, the computer algorithms are tailored to each installation based on flow rates, holding times in the tanks, output levels expected etc.

The pH sensor is preferably selected according to the pH and fluoride concentration of the wastewater. Normal pH electrodes dissolve rapidly in highly acidic and high fluoride content wastewater. This is not a problem in traditional control schemes with large amounts of lime additions, since there is no active pH control of the influent wastewater, only the effluent water after the fluoride has been removed. Preferably the pH sensor is selected from antimony electrodes and special fluoride resistant glass pH electrodes. Antimony electrodes are mostly preferred.

Rapid scaling of the pH and fluoride sensing electrodes can occur due to the large amount of added calcium salts and the rapid precipitation of calcium fluoride, and of byproducts such as calcium silicate, calcium sulfate, calcium phosphate, calcium fluorophosphate, precipitated organic polymers such as photoresist residues, etc. To avoid frequent manual cleaning, the fluoride electrode is preferably self cleaning fluoride sensing electrodes.

Figure 6:
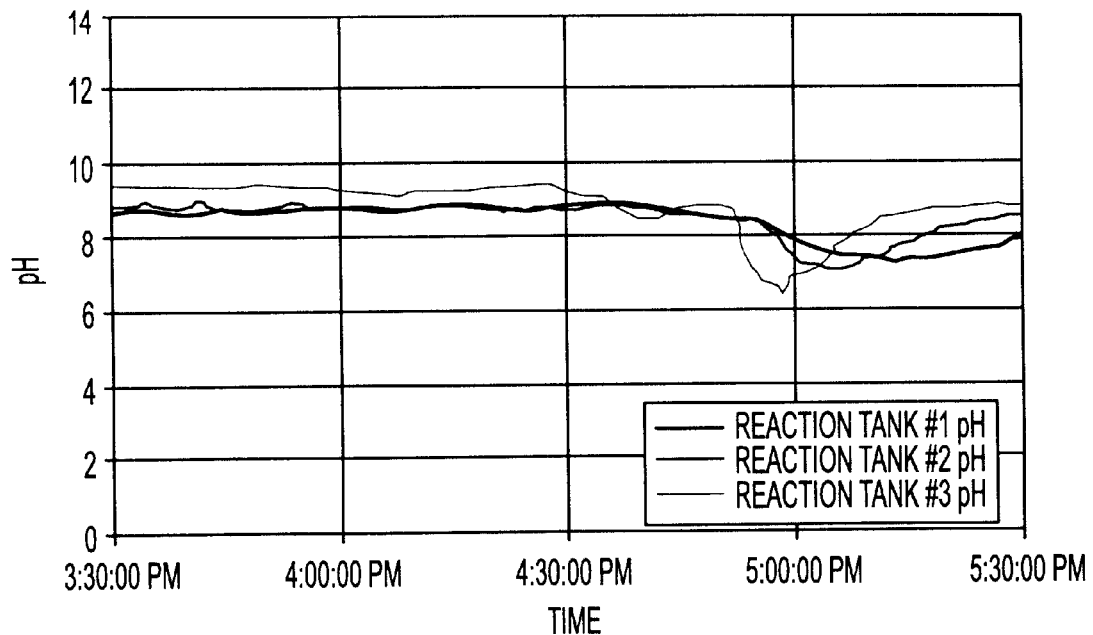
FIG. 6 is a graph showing pH control with small acid dump at about 7 $m^3$/hr in accordance with an exemplary embodiment of the invention;.
Figure 7:
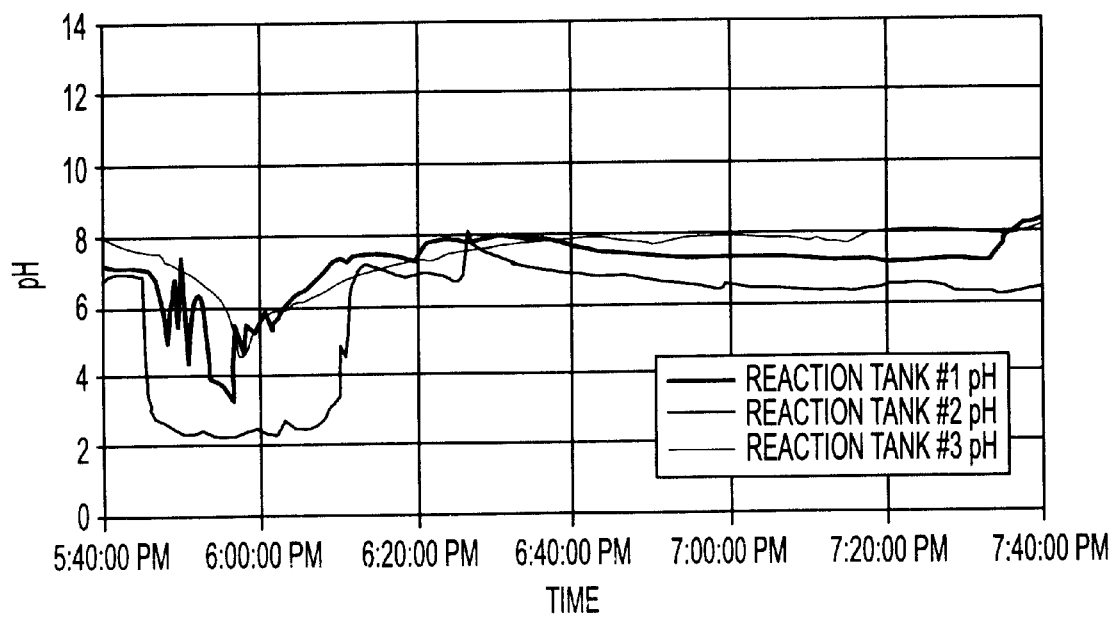
FIG. 7 is a graph showing a system pH response to a very large acid dump in accordance with an exemplary embodiment of the invention.

FIG. 6 shows how well the automatic control system 10 handles a standard acid dump at about 7 m$^3$/hr (30 gpm). Periodically there is a massive acid dump which is much more difficult to control. FIG. 7 shows how well the system responds to a very large acid dump. The large dumps correspond to a discharge of about 60 liters (16 gallons) of concentrated HCl. Flow rate can be from less than 5 to more than 10 m$^3$/hr (less than 22 to more than 44 gpm) during such dumps, which makes pH control more difficult.

In one embodiment, the present system 10 further comprises a backflush tank 40. The backflush tank 40 comprises an input 42 for adding coagulants and/or flocculants to the treated wastewater from the reaction tank 20. The calcium fluoride (CaF$_2$) precipitate particles are generally very small and difficult to filter. The coagulants added to the backflush tank 40 undergo rapid hydrolysis to form complex gelatinous suspensions and precipitates, which engulf and coagulate calcium fluoride seed particles and some fluoride anions to form charged coagulated agglomerates. An oppositely charged polymeric flocculant added into the backflush tank 40 destabilizes the charged coagulated agglomerates to form a polymer bridged agglomerated particles which are large enough for effective filtration by the membrane 55 in the filter tank 50. The production of the well-defined non-sticky particles is important to avoid membrane clogging. Suitable coagulants and flocculants used in the present invention include EnChem 0696 and EnChem 9025 polymer available from Microbar System, Inc. in Sunnyvale, Calif.

In another embodiment of the present invention, the system 10 of the present invention preferably comprises additional two or more reaction tanks 31 and 32 based on the flow rate of the wastewater to be treated. Generally reaction tanks 31 and 32 are smaller than reaction tank 20 since they are operated as overflow tanks. Reaction tanks 31 and 32 preferably include pH sensors 26b and 26c connected to the controller 15 which defines pH setpoints for these tanks. Inputs 24b and 24c are provided in the reaction tanks 31 and 32 for adding calcium salts automatically controlled by the controller 15. Inputs 25b and 25c are provided for adding an acid or base to adjust pH in reaction tanks 31 and 32 automatically controlled by the controller 15. In this embodiment, reaction tanks 31 and 32 can have an effective volume of about 300 gal and their holding time vary from about 6 to 12 minutes. These holding times are based on pure slug flow, or first in-first out liquid flow. The actual flow is governed by the standard exponential mixing and dilution equations of fluid flow. Reaction tank 32 is actually more mixed than tanks 20 and 31, as it functions as a transfer tank. Reaction tank 32 is actively pumped down by at least 100 gallons each time it fills, in order to feed the fluoride treated wastewater to backflush tank 40.

The calcium addition to the tanks 31 and 32 will depend on the total flow rate through the system, the total amount of fluoride in tank 20, the initial pH, the presence and amount of ammonia, the residence time in each tank, and the desired effluent concentration of fluoride. While these addition rates can be approximated by calculations, it is preferably set experimentally. Preferably, the calcium amount added to tanks 31 and 32 is a fixed ratio of the amount added to reaction tank 20. More preferably, the amount added to tanks 31 and 32 is in a fixed rate from 5 to 25% of the amount added to the tank 20.

The pH in reaction tank 31 and 32 are usually fine tuned only since most of the pH adjustment occurs in reaction tank 20. The data in FIG. 7 shows how well the system 10 of the present invention adjusts pH in reaction tanks 31 and 32, despite the high total acidity in reaction 20. The current software algorithms are very successful at pH control. For flouride removal, a narrower pH range of 6–9 is necessary. For arsenic removal, pH control to 7–8 is required.

Experimental

The following examples illustrates the system and method of the present invention for batch treatment of fluoride; continuous treatment of wastewater with random dumps of fluoride; and continuous treatment of wastewater with continuously varying high levels of fluoride. The present system treats all of these processes under automatic computer control. The following experiments are provided for illustrative purposes only and are not intended to limit the invention.

The wastewater is treated with a combination of liquid calcium chloride, acid and base for pH adjustment, and EnChem 0696 and EnChem 9025 coagulants and flocculants. Ammonia and organic materials do not interfere with the process. The amounts of calcium chloride used will depend on the amount of fluoride, the desired output level of fluoride, and to a lesser extent on the type of treatment process. Batch treatment will typically use about 1.2–1.3 moles of calcium per two moles of fluoride. Flowing treatment systems need larger amounts, from about 1.5–2 moles of calcium per two moles of fluoride. The amount of EnChem 0696 is typically about 0.05–0.10 ml/l (0.2–0.4 ml/gal), and the amount of EnChem 0625 is typically about 0.002–0.004 ml/l (0.008–0.016 ml/gal) EnChem 9025, at pH 7–8.

EXAMPLE 1

This example illustrates the system and method of the present invention for batch treatment of fluoride. The single fluoride electrode controls the titration and precipitation of calcium fluoride, and the pH sensor controls addition of calcium chloride, down to a pre-determined fluoride treatment set point. Higher levels of ammonia may need a slightly larger amount of calcium chloride, but the present system automatically compensates for this. Likewise, dissolved silicates, phosphates, and high levels of sulfate, may also react with calcium to form insoluble precipitates. The present process automatically adds sufficient calcium to maintain the fluoride treatment setpoint. FIG. 2 shows the test results for batch treatment of 1000 ppm fluoride wastewater.

EXAMPLE 2

This example illustrates the system and method of the present invention for continuous treatment of wastewater with random dumps of fluoride. This is usually the most difficult type of treatment due to the kinetics of the reaction, which are faster at low pH and high fluoride and calcium concentrations. FIG. 4 shows the data from a typical dump at a fab that treats a nominal 12 m3/hr (50 GPM) wastewater flow. The fluoride in the wastewater before treatment is as high as 1000 ppm, after treatment less than 10 ppm. In this example, the system consists of three cascading tanks. FIG. 4 shows the fluoride concentration in the first input tank, and in the final filtered wastewater from the treatment system.

EXAMPLE 3

Figure 8:
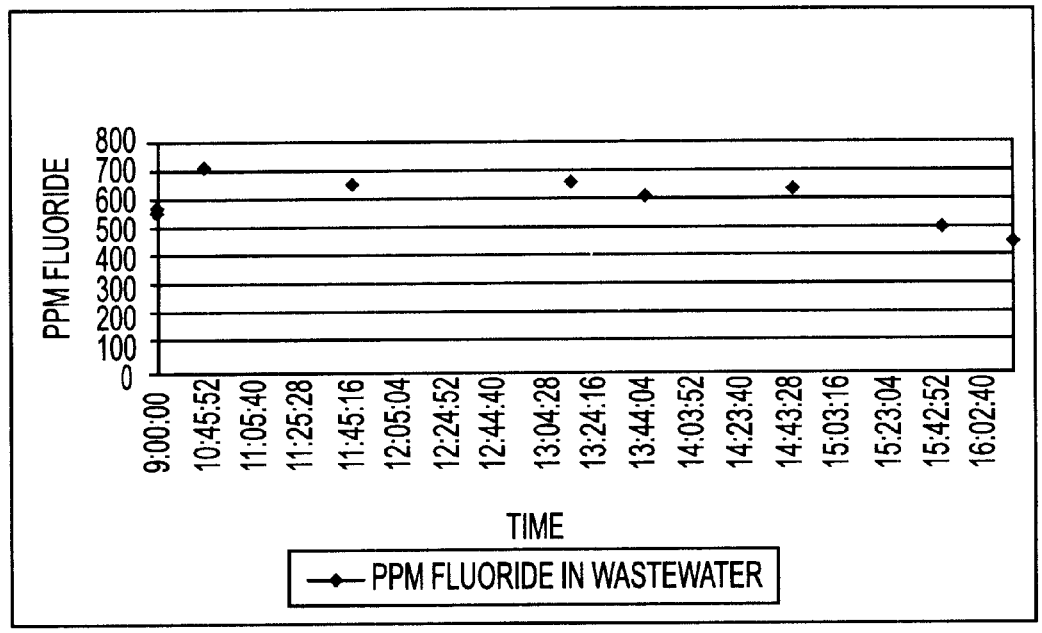
FIG. 8 is a graph showing high and relatively constant fluoride concentration of untreated wastewater prior to treatment in accordance with the present invention.
Figure 9:
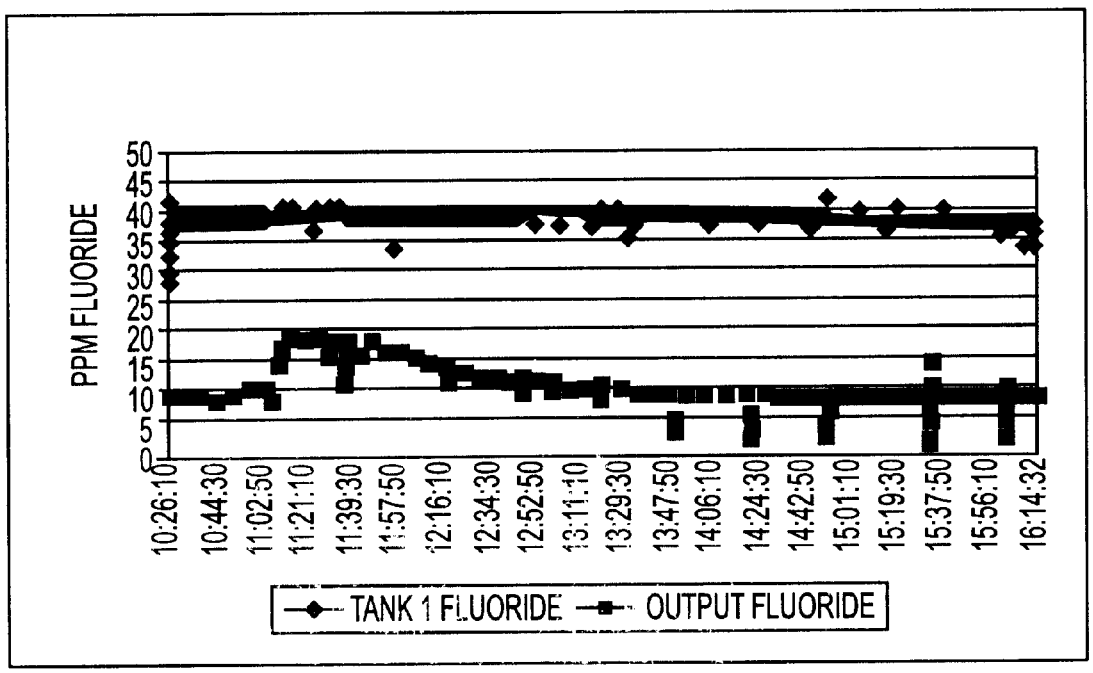
FIG. 9 is a graph showing treatment results of wastewater as depicted in FIG. 8 in accordance with the present invention.
Figure 10:
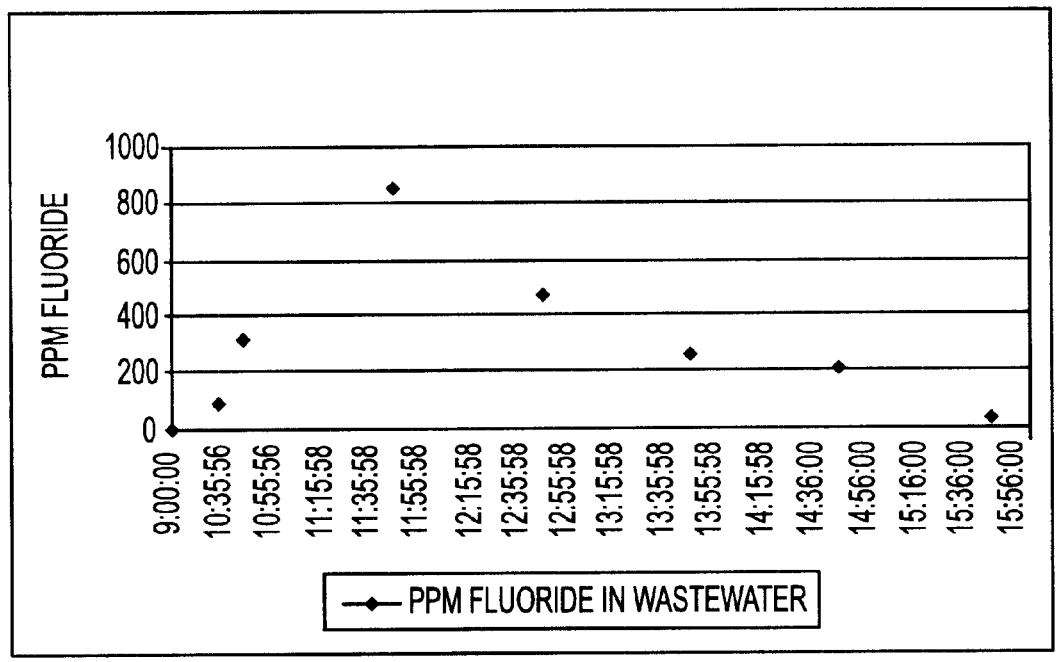
FIG. 10 is a graph showing highly variable fluoride concentration of untreated wastewater prior to treatment in accordance with the present invention.

This example illustrates the system and method of the present invention for continuous treatment of wastewater with continuously varying high levels of fluoride. This is the most common type of treatment system. Large facilities usually have a segregated drain for fluoride bearing wastes. This can consist of lower concentration of fluorides from cleaning and rinsing, and higher concentration of fluorides from process baths, tube cleaning and others. The present system automatically handles wide variations in fluoride concentration. The upper limit that can be treated by the present system is as high as 10,000 ppm (10 g/l) fluoride. The present process is very efficient at high fluoride concentrations, thus there is no need to dilute concentrated fluoride wastes to low levels. FIGS. 8–11 show the data from a fab that treats a 1.2 m3/hr (5 GPM) wastewater flow to a fluoride level less than 20 ppm. FIGS. 8 and 10 show the fluoride in the influent wastewater, wherein FIG. 8 is for a day when the wastewater fluoride concentration was high and relatively constant and FIG. 10 was for a day when the wastewater was highly variable, with low fluoride concentrations at the beginning and end of the day.

Figure 11:
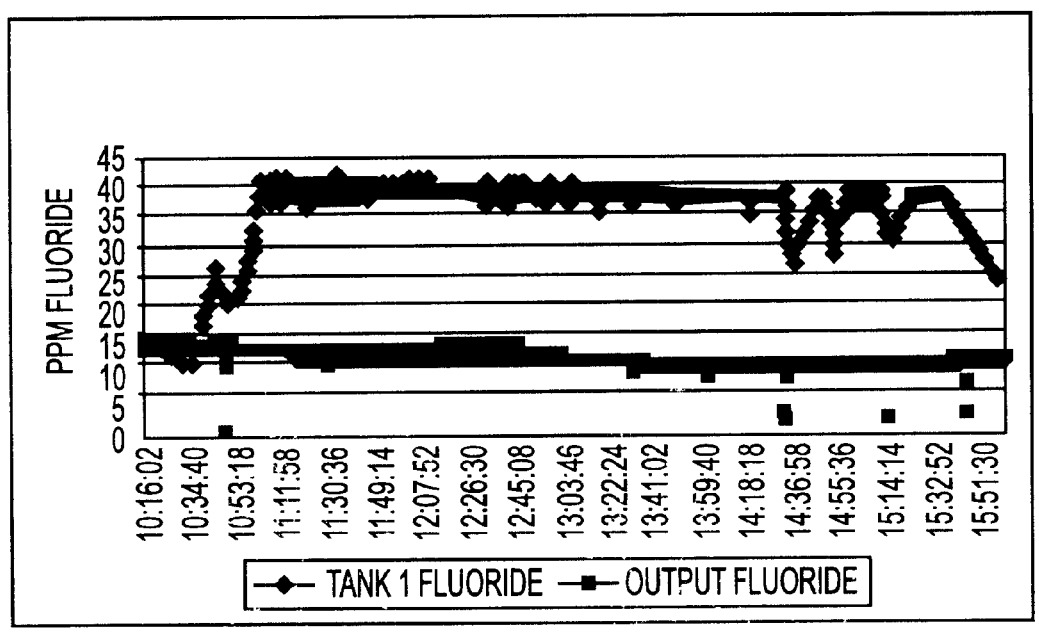
FIG. 11 is a graph showing treatment results of wastewater as depicted in FIG. 10 in accordance with the present invention.

The fluoride treatment system consists of three cascading tanks. FIGS. 9 and 11 show the fluoride concentration in the first input tank, and in the final filtered wastewater from the treatment system. The fluoride treatment setpoint in the first input tank is at 40 ppm in this system. No matter what the concentration of the influent wastewater, as long as it is above 40 ppm it is automatically treated down to 40 ppm. Phosphate, silicate, and sulfate do not interfere. Further treatment is done in additional tanks, to achieve the desired effluent fluoride concentration.

One advantage of the present invention is the reduction of cost for fluoride removal. This is accomplished by simplified yet effective control systems using only one input and output fluoride sensing electrode, one or more reaction tanks; and associated computer programmable controller with effective software for precise pH and fluoride control. The savings come from a smaller amount of costly calcium chemicals used, less acid and base usage due to more precise pH control, less sludge generation so lower disposal costs, faster and easier filtration due to lesser sludge generation, less maintenance due to fewer sensors, and so on. Another advantage is that all of the fluoride removal steps take place automatically under computerized control, thus most operating errors are eliminated.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A system for removing fluoride from a flouride bearing industrial wastewater, comprising:
    a reaction tank for processing said wastewater, said reaction tank including a first input for feeding said wastewater into said reaction tank, and a second input for adding calcium salts to said reaction tank to form precipitated fluoride;
    a filtration tank for removing said precipitated fluoride from said wastewater, said filtration tank including an output for discharging filtered wastewater;
    a single fluoride electrode disposed at said first input of said reaction tank, said single fluoride electrode measuring a concentration of fluoride in said wastewater fed into said reaction tank and providing an output signal; and
    a programmable controller for controlling addition of said calcium salts into said reaction tank responsive to said output signal provided by said single fluoride electrode so as to provide a treated output stream of desired quality.

2. The system of claim 1 wherein said programmable controller defines a setpoint of fluoride concentration in said reaction tank and automatically controls addition of calcium salts based on said setpoint defined by said controller and said output signal from said single fluoride electrode.

3. The system of claim 1 wherein said fluoride electrode is self-cleaning fluoride electrode.

4. The system of claim 1 wherein said reaction tank further comprises a pH sensor and a third input for adding an acid or a basic solution to said tank, said pH sensor measuring pH of said wastewater and providing an output signal to said controller.

5. The system of claim 4 wherein said pH sensor is selected from a group consisting of antimony electrodes and fluoride resistant glass pH electrodes.

6. The system of claim 4 wherein said programmable controller defines a pH setpoint in said reaction tank and automatically controls addition of said acid or basic solution based on said setpoint defined by said controller and said output signal provided by said pH sensor.

7. The system of claim 1 wherein said reaction tank comprises at least a first, second, and third tank in series, each tank being provided with a pH sensor for measuring pH in said each tank.

8. The system of claim 7 wherein said first tank is added from stoichiometric to 125% stoichiometric of calcium salts, and said second and third tanks are added from 5 to 25% of amount added to said first tank.

9. A method of removing fluoride from a fluoride bearing industrial wastewater, comprising:
    defining a setpoint of concentration of fluoride using a programmable controller;
    measuring a concentration of fluoride in said wastewater using a single fluoride electrode;
    automatically adding calcium salts to said wastewater in an amount based on said setpoint defined by said controller and said concentration of fluoride measured by said single fluoride electrode so as to provide a treated output stream of desired quality.

10. The method of claim 9 wherein said calcium is added in an amount of from stoichiometric to 125 percent of stoichiometric.

11. The method of claim 9 further comprises defining a pH setpoint using a controller and measuring a pH of said wastewater using a pH sensor, and automatically adding an acid or a basic solution to said wastewater in an amount based on said setpoint defined by said controller and said pH measured by said pH sensor.

12. The method of claim 11 wherein said pH setpoint is defined at a value in a range from 6 to 9.

13. The method of claim 9 further comprises adding a coagulant and/or flocculant to said wastewater.

14. The method of claim 9 wherein said concentration of fluoride in said wastewater fed into said reaction tank is continuously varied.

15. The method of claim 14 wherein said concentration of fluoride in said wastewater fed into said reaction tank is in a range from 50 to 10,000 ppm.

16. The method of claim 9 further comprises monitoring a concentration of fluoride in discharging wastewater using a single fluoride electrode, and said concentration of fluoride monitored being in a range from 2 to 10 ppm.

17. A system for removing fluoride from a fluoride bearing industrial wastewater, comprising:
    a reaction tank for processing said wastewater, said reaction tank including a first input for feeding said wastewater into said reaction tank, and a second input for adding calcium salts to said reaction tank to form precipitated fluoride;
    a filtration tank for removing said precipitated fluoride from said wastewater, said filtration tank including an output for discharging filtered wastewater;
    a first single fluoride electrode disposed at said first input of said reaction tank, said first single fluoride electrode measuring a concentration of fluoride in said wastewater fed into said reaction tank and providing an output signal;
    a second single fluoride electrode disposed at said output of said filtration tank, said second single fluoride electrode monitoring a concentration of fluoride in said filtered wastewater and providing an output signal; and a programmable controller for controlling addition of said calcium salts into said reaction tank responsive to said output signal provided by said first and second fluoride electrode so as to provide a treated output stream of desired quality.

18. The system of claim 17 wherein said programmable controller defines a setpoint of fluoride concentration in said reaction tank and automatically controls addition of calcium salts based on said setpoint defined by said controller and said output signal provided by said first and second fluoride electrode.

19. The system of claim 17 wherein said reaction tank further comprises a pH sensor and a third input for adding an acid or a basic solution to said tank, said pH sensor measuring pH of said wastewater fed into said reaction tank and providing an output signal to said controller, and said controller defining a pH setpoint in said reaction tank and automatically controlling addition of said acid or basic solution based on said setpoint and said output signal provided by said pH sensor.

* * * * *